United States Patent [19]

Roeper

[11] Patent Number: 5,707,028

[45] Date of Patent: Jan. 13, 1998

[54] COVER PLATE WITH LENGTH COMPENSATION

[75] Inventor: Dieter Roeper, Ulm, Germany

[73] Assignee: Drägerwerk Aktiengesellschaft, Lübeck, Germany

[21] Appl. No.: 566,785

[22] Filed: Dec. 4, 1995

[30] Foreign Application Priority Data

Dec. 6, 1994 [DE] Germany .......................... 44 43 395.6
Sep. 29, 1995 [DE] Germany ...................... 195 36 372.8

[51] Int. Cl.[6] .................................................. B64D 11/00
[52] U.S. Cl. .................... 244/118.5; 244/119; 52/726.1; 52/591.4
[58] Field of Search .............................. 244/118.5, 119; 52/630, 726.1, 591.4, 591.5, 220.1; 296/37.7

[56] References Cited

U.S. PATENT DOCUMENTS

| 3,330,506 | 7/1967 | Robillard et al. | 244/118.5 |
| 3,370,813 | 2/1968 | Albertine et al. | 244/118.5 |
| 4,044,520 | 8/1977 | Barrows | 52/591.4 |
| 4,242,390 | 12/1980 | Nemeth | 52/591.4 |

FOREIGN PATENT DOCUMENTS

| 23 09 848 C3 | 1/1980 | Germany . | |
| 428299 | 8/1948 | Italy | 52/591.4 |
| 294101 | 4/1965 | Netherlands | 52/592 |
| 2097836 | 11/1982 | United Kingdom | 52/220.1 |

Primary Examiner—Andres Kashnikow
Assistant Examiner—Tien Dinh
Attorney, Agent, or Firm—McGlew and Tuttle

[57] ABSTRACT

A cover plates device for closing installation ducts in the interior fitting of spaces, including cover plates located one behind the other and are provided with ventilation and electrical components. An axial length compensation between two adjacent cover plates is provided in a simple manner. A first front side of a first cover plate has—in the area of a surface facing the installation duct—a shoulder-like recess of the height H, which extends approximately rectangularly into the first cover plate 1. A second front side of a second cover plate, which is directed toward the first front side of the first cover plate, is designed corresponding to the height H of the recess such that it can be introduced into the recess in such a manner that length tolerances between the cover plates 1, 2, 3 are compensated.

19 Claims, 1 Drawing Sheet

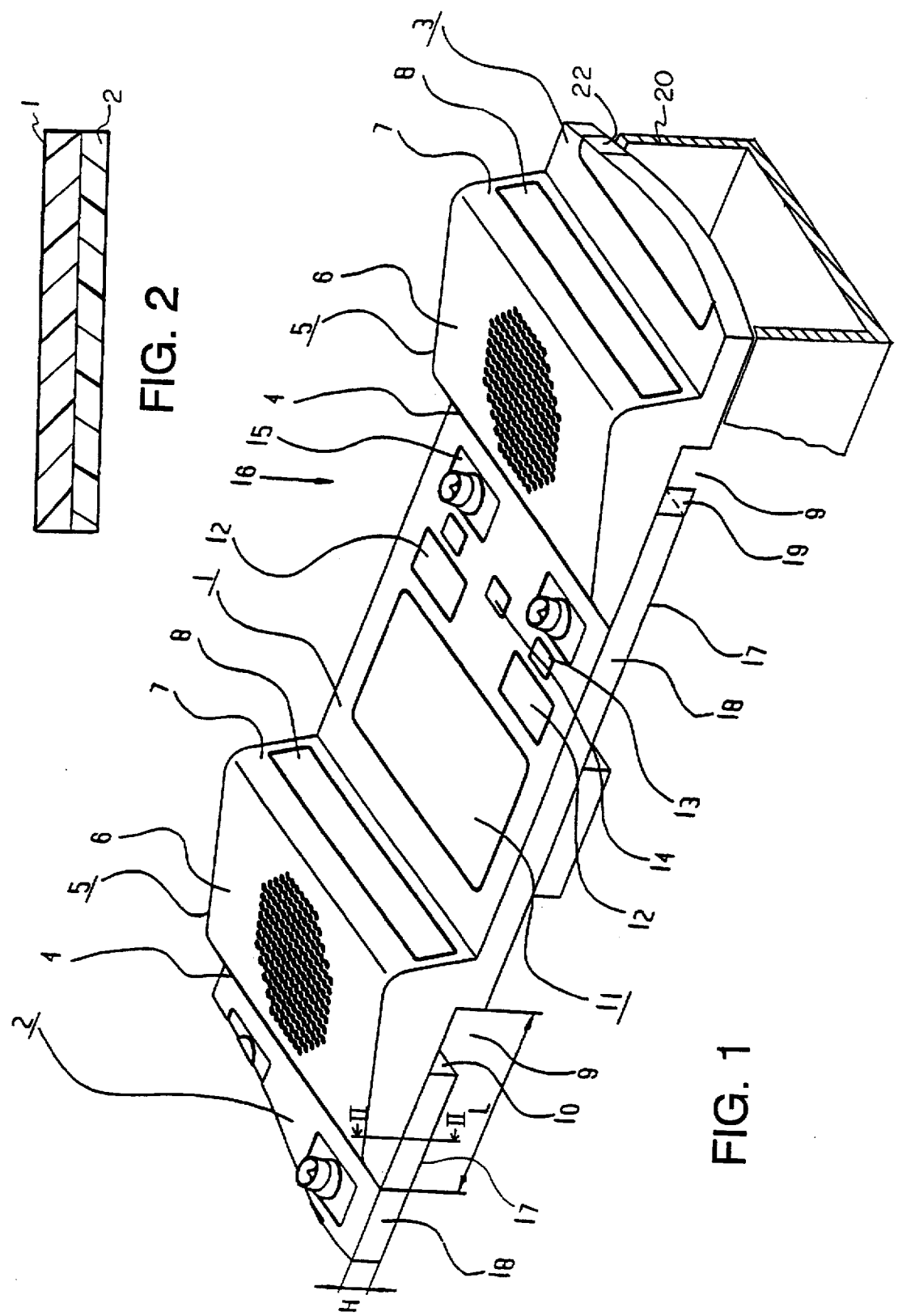

COVER PLATE WITH LENGTH COMPENSATION

FIELD OF THE INVENTION

The present invention pertains to cover plates provided with gas, ventilation, engineering and electric components for closing installation ducts in the interior fitting of spaces, wherein the cover plates abut each other on their respective front sides.

BACKGROUND OF THE INVENTION

A supply unit for electricity and pressurized gases with individual installation ducts located one above the other, which are closed with segment-like cover plates, has become known from DE 23 09 848. The cover plates are provided with outlets for electricity and for pressurized gases, and some also accommodate switches, valves and indicator scales. Depending on the needs, the cover plates, which are correspondingly configured differently, are fastened to the installation ducts such that the front sides of adjacent cover plates abut each other.

One disadvantage of the prior-art supply unit is the fact that differences in length between the cover plates cannot be compensated. If, e.g., an outlet located on a cover plate is to be fastened at a defined point of the installation duct, a gap may appear against an adjacent cover plate, which must be closed with an additional compensating plate, because the position within the cover plate cannot be changed.

The length compensation in the supply duct (of airplanes, coaches, trains, streetcars and other transportation systems), which is necessary due to structural tolerances, thermal expansion of the cell or due to a change in the distance between seats, is accomplished in the state of the art by inserting compensation panels.

This may lead to a plurality of visible gaps, which create the optical impression of many elements placed next to each other.

The manufacture of the many different components is disadvantageous not only in terms of appearance, but also in terms of the manufacturing and installation costs. The provision of different compensating plates makes the installation of the cover plates difficult and, on the other hand, it also increases the stocking costs.

SUMMARY AND OBJECTS OF THE INVENTION

The primary object of the present invention is to improve a device of the above-described type such that an axial compensation in length between two adjacent cover plates on an installation duct is possible in a simple manner.

According to the invention, a combination of two cover plates is provided for closing installation ducts in the interior fitting or surfaces of spaces. The cover plates are located one behind the other and are provided with gas engineering and electric utility components. The cover plates abut each other on their respective front sides. A first cover plate front side is provided, in an area of the surface facing the installation duct, with a shoulder-like recess of a height H. The recess extends approximately rectangularly into the first cover plate. The second cover plate front side includes a portion which is directed toward the first cover plate front side and is formed corresponding to the height H of the recess such that it can be introduced into the recess to provide length tolerance compensation between the cover plates.

A panel with a recess or pocket, under which the end of another identical panel can be pushed, is formed due to the formal geometric shape at the beginning of each panel. The length of the recess or pocket determines the path of displacement and consequently the extent of the tolerance compensation.

The advantage of the present invention is essentially the fact that the cover plates have different front sides cooperating in the manner of tongues and grooves, wherein the length compensation is performed by changing the engaged lengths of the groove and the tongue belonging to it. A first front side of a first cover plate has as the groove a recess which extends approximately rectangularly into the first cover plate and is located on the surface of the cover plate facing the installation duct. A second front side of a second cover plate, which points in the direction of the first front side of the first cover plate, is designed corresponding to the height H and width of the recess of the first cover plate, so that the second front side can be introduced into the recess of the first front side in the manner of a tongue. The degree of overlap between the first and second front sides is an indicator of the length compensation performed. The length L of the recess indicates the maximum possible length compensation between two adjacent cover plates. The cover plates are preferably designed as one-piece PU plastic moldings. Inexpensive manufacture in large lots is thus possible.

Spacers are advantageously provided within one recess or even within all recesses between adjacent cover plates in order to set a defined degree of overlap on the front sides of the cover plates. The spacers form essentially a stop for the second front sides within the recesses located on the first front sides. The spacers may additionally also be fastened to the installation duct. It is thus possible to transmit longitudinally directed forces between adjacent cover plates to the installation duct.

The cover plates according to the present invention are advantageously used to close supply ducts in airplanes, buses, coaches, trains, and streetcars, because, due to their shape and design, they are suitable for compensating length tolerances without a conspicuously recognizable gap being formed as a result. Length compensation may become necessary, e.g., in airplanes when the cover plates must be adjusted to different distances between seats.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of the cover plate assembly according to the invention showing the installation duct partially broken away and in cross section; FIG. 2 is a cross sectional view taken along line II—II of FIG. 1.

DESCRIPTION OF THE PREFERRED EMBODIMENT

FIG. 1 shows a combination of a first cover plate 1, a second cover plate 2 and a third cover plate 3, which close an installation duct containing supply lines, which is not shown in the figure. The cover plates 1, 2, 3 have the same design or pattern. The cover plate 1 is shown completely in the figure, but the cover plates 2 and 3 are shown only partially. A triangular attachment 5 with a first visible surface 6 and a second visible surface 7 is located on a first front or end side 4 of the first cover plate 1. A loudspeaker, not shown in the figures, is arranged behind the first visible surface 6, and a display unit 8 is arranged behind the second visible surface 7. A rectangular recess of the height H and the length L, which is open toward the first front or end side 4, is provided under the attachment 5. A second front or end side 10 of the second cover plate 2, which also has the height H, engages the recess 9 in the manner of a tongue. Due to the identical design of the cover plates 1, 2, 3, there is also a corresponding overlap between the second front side 10 of the first cover plate 1 and the attachment 5 or the recess 9 of the third cover plate 3, which is located adjacent to the first cover plate 1. The differences in length between the individual cover plates 1, 2, 3 can be compensated by displacing the second front sides 10 within the recesses 9.

The cover plates 1, 2, 3 according to the present invention are preferably used above passenger seats in airplanes. They additionally contain other functional components such as, an emergency oxygen supply unit 11 which can be opened, reading lamps 12, switches 13 for actuating the reading lamps 12, a paging button 14, as well as fresh air nozzles 15. A longitudinal displacement between individual cover plates 1, 2, 3 may develop, e.g., due to different distances between rows of seats. By displacing the cover plates 1, 2, 3 in relation to one another within the recesses 9, a simple correction is possible, without gaps being recognizable in the visible area or surface 16 of the cover plates 1, 2, 3. The underside or hidden surface 17 of the cover plates 1, 2, 3 lie on the installation duct, not shown in the figure. Spacers 19 can be placed in the recesses 9 to set a defined degree of overlap and periodity to the pattern presented by the visible area.

The cover plates 1, 2, 3 may be manufactured in an especially simple manner from PU foam by making the attachment 5 in one piece with and projecting from one side of a rectangular base plate 18 of the thickness H.

In operation, each of the cover plates 1, 2 and 3 is fixed to, for example, an airplane installation duct 20, by appropriate fixing means 22. When there is a need to change the position of passenger seats of the airplane, for example for changing a cabin from economy class to first class or vice versa, the relative position of the cover plates 1, 2, 3 is adjusted, namely the length L is changed. The cover plates 1, 2, 3 are then refastened to the installation duct 20, in the new position.

While a specific embodiment of the invention has been shown and described in detail to illustrate the application of the principles of the invention, it will be understood that the invention may be embodied otherwise without departing from such principles.

What is claimed is:

1. Cover plate device for closing an installation duct carrying a supply line, comprising:
    a first cover plate with a first cover plate first front side and a first cover plate second front side and a surface facing the installation duct, said first cover plate having a shoulder-like recess with a recess height, said recess extending approximately rectangularly into said first cover plate, said first cover plate including a functional component connectable to the supply line;
    a second cover plate with a second cover plate first front side and a second cover plate second front side, said second cover plate including a functional component connectable to the supply line, said second cover plate second front side being directed toward said first cover plate first front side, said second cover plate second front side having a portion with a height substantially corresponding to said height of said recess of said first cover plate, said second cover plate second front side extending into said recess such that said first cover plate and said second cover plate together extend a length, said length being varied by changing the extent to which said second cover plate second side extends into said recess.

2. A cover plate device according to claim 1, wherein said second cover plate is identical to said first cover plate including a second cover plate shoulder-like recess.

3. A cover plate device according to claim 2, wherein a spacer is provided in at least one of said first cover plate recess and said second cover plate recess, said spacer limiting an extent of overlap between said first cover plate first front side and said second cover plate second front side.

4. A device according to claim 3, wherein said spacer is fastened to the installation duct.

5. A device according to claim 1, wherein:
    said functional component of each of said cover plates includes a triangular attachment in an area of said first front side including two visible surfaces forming an angle with each other and a loud speaker fastened behind one of said two visible surfaces.

6. A device according to claim 5, further comprising a display unit arranged behind another of said two visible surfaces.

7. A device according to claim 1, further comprising an emergency oxygen supply unit as said functional components, openable toward said space, and arranged on each of said cover plates.

8. A device according to claim 1, further comprising reading lamps as said functional components and arranged on said cover plates.

9. A device according to claim 8, further comprising switches, for switching said reading lamps on and off, connected to said cover plates.

10. A device according to claim 1, further comprising pivotable fresh air nozzles as said functional components and connected to said cover plates.

11. A device according to claim 1, further comprising a paging button as said functional components and arranged on said cover plates.

12. A device according to claim 4, wherein:
    said functional components include a display unit, reading lamps, switches and fresh air nozzles arranged on said cover plates, said functional components being provided in the order following said loud speaker of display unit, reading lamps, switches and fresh air nozzles.

13. A device according to claim 1, wherein said cover plates include means for defining an interior surface of one of an airplane, streetcar, train and levitation vehicle.

14. A method of closing an installation duct carrying a supply line, comprising:
    providing a first cover plate with a first cover plate first front side and a first cover plate second front side and a surface facing the installation duct, said first cover plate having a shoulder-like recess with a recess height, said recess extending approximately rectangularly into said first cover plate, said first cover plate including a functional component connectable to the supply line;
    providing a second cover plate with a second cover plate first front side and a second cover plate second front side, said second cover plate including a functional component connectable to the supply line, said second cover plate second front side being directed toward said first cover plate first front side, said second cover plate second front side having a portion with a height substantially corresponding to said height of said recess of said first cover plate, said second cover plate second front side extending into said recess such that said first cover plate and said second cover plate together extend a length; and adjusting a degree of overlap between said first front side of said first cover plate and said second front side of said second cover plate to change said length of said combined cover plates.

15. A method according to claim 14, further comprising:

providing a seating spacing defined as a space between a back of a first seat and a back of a second seat; and changing said length of said combined cover plates to correspond to a change in said seating spacing.

16. A method according to claim 14, further comprising forming said first cover plate and said second cover plate out of substantially identical molds to form a first cover plate substantially identical to said second cover plate.

17. A supply unit comprising:

an installation duct for carrying a supply line;

a plurality of cover plates slidably mounted on said installation duct, each of said plurality of cover plates including a functional component connectable to the supply line, said each of said plurality of cover plates having a first end and a second end, each of said first ends defining a recess, each of said second ends having a tongue portion complementary to said recess, said plurality of cover plates being arranged on said installation duct with said tongue portion of one cover plate variably insertable into said recess of an adjacent cover plate to vary a distance between said function components.

18. A unit in accordance with claim 17, further comprising:

an attachment extending from said each cover plate from a side opposite said installation duct at said first end, said attachment also defining a portion of said recess and covering a part of said tongue portion of said adjacent cover plate.

19. A unit in accordance with claim 18, wherein:

said attachment is also said functional component of said each cover plate.

* * * * *